United States Patent [19]

Gronbaek

[11] Patent Number: 5,019,114
[45] Date of Patent: May 28, 1991

[54] MOULDING TOOL AND METHOD OF MAKING SAME

[75] Inventor: Jens Gronbaek, Åbenrå, Denmark

[73] Assignee: Danfoss A/S, Nordborg, Denmark

[21] Appl. No.: 605,174

[22] Filed: Oct. 29, 1990

Related U.S. Application Data

[63] Continuation of Ser. No. 415,579, Oct. 2, 1989, abandoned.

[30] Foreign Application Priority Data

Oct. 14, 1988 [DE] Fed. Rep. of Germany ....... 3834996

[51] Int. Cl.⁵ ................................. B21C 3/02
[52] U.S. Cl. ..................... 72/467; 76/107.1; 249/135
[58] Field of Search ............... 72/467; 249/116, 135; 76/107.1, 107.4

[56] References Cited

U.S. PATENT DOCUMENTS

| | | | |
|---|---|---|---|
| 1,108,643 | 8/1914 | Wall | 249/116 |
| 2,147,350 | 2/1939 | Pohl | 249/116 |
| 2,568,440 | 9/1951 | Friedman | 76/107.1 |
| 3,608,351 | 9/1971 | Strandell | 72/467 |
| 3,691,816 | 9/1972 | Strandell | 72/467 |
| 3,810,382 | 5/1974 | Strandell | 72/467 |
| 3,848,453 | 11/1974 | Hardt | 76/107.1 |
| 4,228,673 | 10/1980 | Scheel | 76/107.4 |
| 4,287,749 | 9/1981 | Bachrach | 76/107.1 |

FOREIGN PATENT DOCUMENTS 1014950  9/1957  Fed. Rep. of Germany ........ 72/467
1160355  8/1969  United Kingdom .................. 72/467

*Primary Examiner*—Daniel C. Crane
*Attorney, Agent, or Firm*—Wayne B. Easton; Clayton R. Johnson

[57] ABSTRACT

The moulding tool has an annular die providing a moulding cavity, an inner ring abutting against the die outer peripheral surface and an outer ring abutting against the inner ring outer peripheral surface. The inner ring is made of a material having a higher modulus of elasticity than the material from which the outer ring and die are made. Advantageously the inner ring is made of a carbide metal and the die and outer ring of steel and in the above described relationship to reduce the danger of fracture of the die.

11 Claims, 4 Drawing Sheets

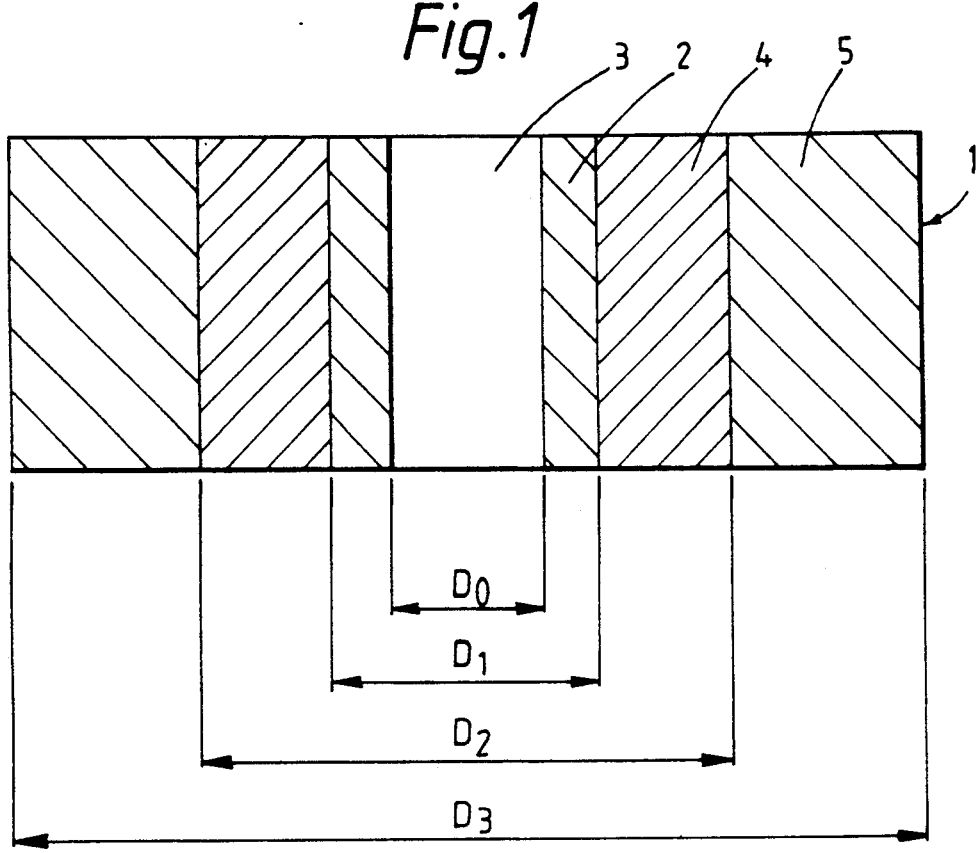
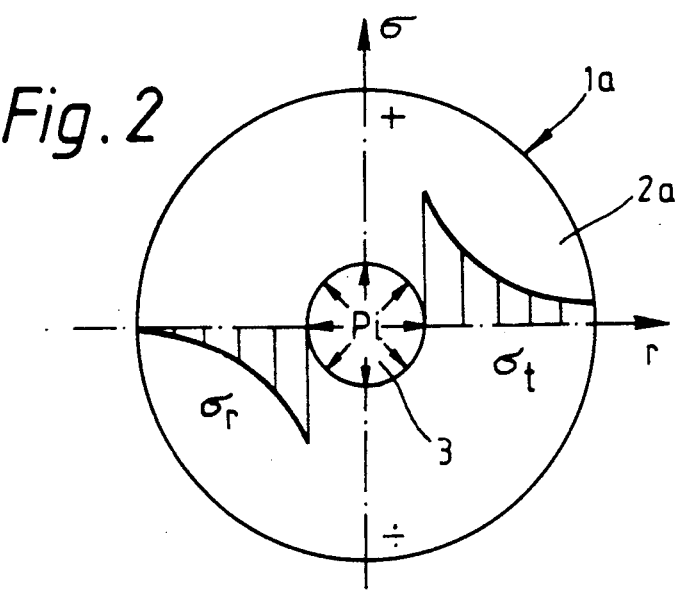

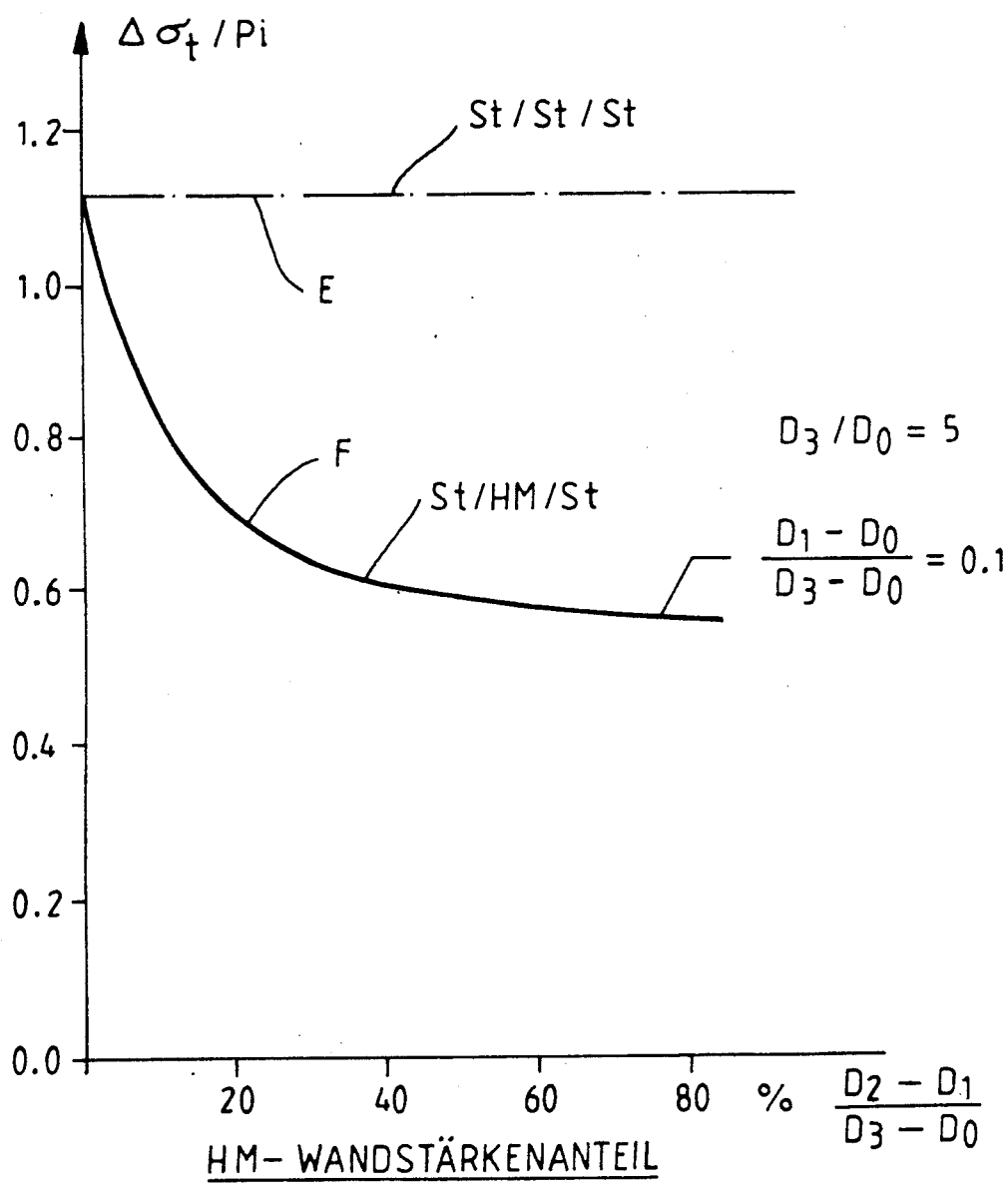

MOULDING TOOL AND METHOD OF MAKING SAME

This is a continuation of application Ser. No. 07/415,579 filed Oct. 2, 1989, now abandoned.

The invention relates to a moulding tool comprising a die having a moulding cavity which is reinforced by an inner ring lying against it under radial bias and by an outer ring lying against the inner ring under radial bias, and to a method of making same.

Moulding tools are often subjected to a high internal working pressure. With the cold flow technology as nowadays employed, pressures of 1,000 to 2,500 N/mm$^2$ are encountered. This leads to tangential tensile stresses in the die which can lead to destruction if no measures are taken.

Accordingly, a moulding tool of the aforementioned kind is known (U.S. Pat. No. 3,608,351), in which the die is reinforced by one or more rings which bring about radial prestressing by shrinking on or by applying a coiled strip under compressive stress. This counteracts the operating pressure, so that fracture can be expected only at a higher limiting pressure.

Particular difficulties arise if the die is not made to be rotationally symmetric but has a polygonal cross-section, serrations or grooves. In this case, the notch effect results in high stress concentrations which lead to destruction of the material at considerably lower operating pressures. For this reason, it is known (U.S. Pat. No. 3,810,382) to build up the die, which is under the prestressing of a coil strip, from several individual parts. However, this multi-part solution is expensive.

The invention is based on the problem of providing a moulding tool of the aforementioned kind that can be subjected to higher loads under otherwise the same conditions without the danger of destroying the die.

This problem is solved according to the invention in that the material of the inner ring has a higher modulus of elasticity than the material of the die and the material of the outer ring.

The higher modulus of elasticity of the inner ring ensures that the die is deformed only slightly in operation. The outer ring having a lower modulus of elasticity prestresses the inner ring to such an extent that the inner ring can lie against the die with a considerable radial prestressing without fracturing. In this way, the moulding tool can be subjected to higher operating pressures. In most cases, non-rotationally symmetrical dies can also be made in one piece. The lower stressing of the die has the overall result of a longer life.

The results are all the better the higher the modulus of elasticity of the inner ring material is in comparison with that of the die material. For this reason, the modulus of elasticity of the inner ring material should be at least 1.5 times the modulus of elasticity of the die material. In practice, 2 to 3 times is desirable. The inner ring forms a hard border for the die but is itself very sensitive to elongation. However, the outer ring can apply prestressing which counteracts elongation.

It is particularly favourable if the die is of steel and the inner ring of sintered carbide metal.

It is also advantageous for the outer ring to be of at least two layers and in particular consist of a coiled strip. In comparison with a shrunk-on one-piece outer ring, one obtains the advantage of achieving 50% to 70% higher prestressing, that the prestressing is reproducible and that the production is cheaper.

It is also recommended that the wall thickness of the inner ring be at least 25%, preferably 30% to 50%, of the entire wall thickness. The thicker the inner ring, the more will it be able to reduce the tangential forces at the inner periphery of the die.

It is favourable for production if the outer ring is applied to the inner ring with radial prestressing and the thus formed ring combination is shrunk onto the die. The inner ring is therefore already reinforced by the outer ring during shrinking on so that it will not suffer under the shrinking forces.

The outer ring can be shrunk onto the inner ring. It is even more favourable if the outer ring is produced by winding a strip onto the inner ring.

An example of the invention will now be described in more detail with reference to the drawing, wherein:

FIG. 1 is a longitudinal section through a moulding tool according to the invention;

FIG. 2 shows the stress conditions in a one-piece moulding tool;

FIG. 6 is a graph of the relationship of the tangential stress to the internal pressure against the ratio of the wall thickness of the inner ring to the entire wall thickness.

Figure 3:
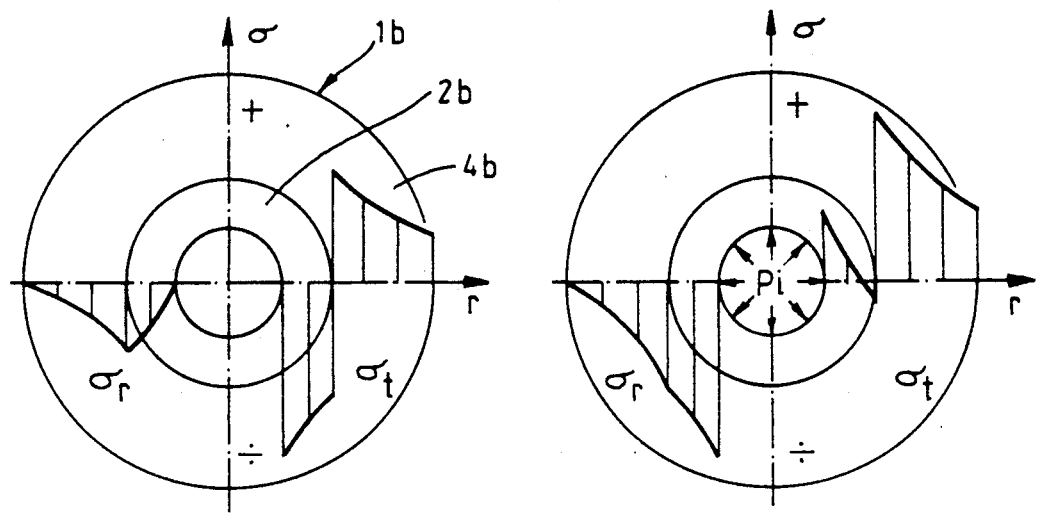
FIG. 3 shows the stress conditions in a two-part moulding tool.

The moulding tool 1 in FIG. 1 has a cylindrical die 2 with a moulding cavity 3, an inner ring 4 and an outer ring 5. The die 2 consists of steel, the inner ring 4 of sintered carbide metal and the outer ring 5 again of steel. The material of the inner ring 4 thus has a modulus of elasticity which is 2 to 3 times larger than the modulus of elasticity of the die 2 and outer ring 5.

The inner ring 4 is shrunk onto the die 2. The outer ring 5 consists of a coiled strip which was wound onto the inner ring 4 under prestressing before the latter had been shrunk onto the die 2. The radial prestressing with which the outer ring 5 lies against the inner ring 4 is higher than the radial prestressing with which the inner ring 4 lies against the die 2.

In the drawing:

$D_0$ = internal diameter of the die 2

$D_1$ = external diameter of the die 2 and diameter of the inner ring 4

$D_2$ = external diameter of the inner ring 4 and internal diameter of the outer ring 5

$D_3$ = external diameter of the outer ring 5

The relationships are so selected that the thickness $(D_2 - D_1)$ of the inner ring 4 is more than 25% of the total thickness $(D_3 - D_0)$ of the moulding tool and preferably somewhat above 30%. The thickness $(D_1 - D_0)$ of the die 2 can be between 5% and 20%, preferably about 10%, of the total wall thickness $(D_3 - D_0)$. The thickness $(D_3 - D_2)$ of the outer ring 5 should therefore be between 30% and 50%.

Figure 4:
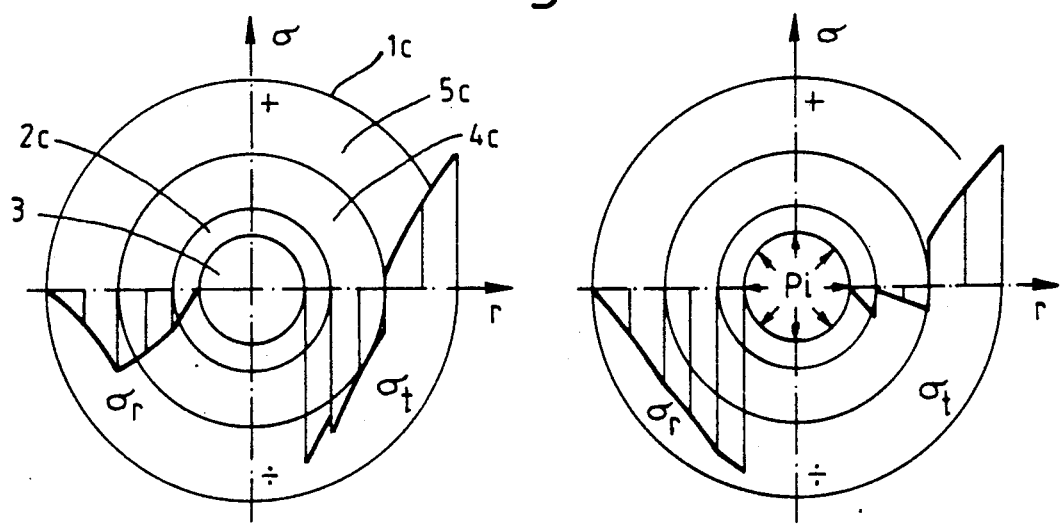
FIG. 4 shows the stress conditions in a three-part moulding tool according to the invention with an outer ring consisting of a coiled strip.

For a better understanding of the ratios, attention is drawn to FIGS. 2 to 4. FIG. 2 illustrates a one-piece moulding tool 1a which consists practically only of the die 2a. If a working pressure $p_i$ exists in the moulding cavity, an externally directed radial stress $\Sigma_r$ is produced which has its maximum value at the moulding cavity 3 and reduces to zero towards the outer periphery. This is illustrated at the left hand half of the graph. The right hand half illustrates the tangential stress $\Sigma_t$ which has its maximum value at the moulding cavity 3 and reduces towards the periphery. Comparatively large tangential forces occur so that, especially in the case of brittle material such as tool steel, high-speed steel or carbide steel, there is a danger of fracture.

FIG. 3 shows the conditions occurring with a two-part moulding tool 1b which has a die 2b and a single ring 4b which is shrunk onto the die. Consequently, as is shown in the left hand picture, radial stresses and tangential stresses are already present in the rest condition. The radial stress $\Sigma_r$ is a maximum at the dividing gap between the die 2b and ring 4b. At this gap, there is also a reversal in the direction of the tangential stress $\Sigma_t$. When this arrangement is subjected to an operating pressure $p_i$, one obtains the conditions illustrated in the right hand picture of FIG. 3. The radial stress has its maximum value at the inner periphery of the die. The tangential stresses are kept small at the upper periphery by reason of the prestressing and only occur to a higher extent where they are no longer a problem.

FIG. 4 illustrates the conditions in a three-part moulding tool 1c according to the invention.

The moulding tool 1c consists of the die 2c, the inner ring 4c and the outer ring 5c. The outer ring 5c is in the form of a coiled strip.

The left hand part of the figure illustrates the tangential stresses and the radial stresses in the rest condition. The radial stresses $\Sigma_r$ are at their highest at the separating gap between the inner ring 4c and the outer strip coil 5c. At this gap, there is also a change in the direction of the tangential stress $\Sigma_t$. It is to be noted that the gap pressure (equal to $-\Sigma_r$) between the die and the inner ring is lower than between the inner ring and the outer coil of strip.

When this arrangement is subjected to an operating pressure $p_i$, the conditions shown in the right hand picture of FIG. 4 obtain. The radial stress has its maximum value $= -p_i$ at the inner periphery of the die. The tangential stresses in the die 2c are kept lower than in the right hand construction of FIG. 3 as a result of the prestressing and the three-part construction according to the invention. With brittle die materials, the lower tangential tensile stress leads to a longer life. By reason of the high radial prestressing between the inner ring and the outer coil of strip, the tangential stress in the inner ring 4c is also kept lower than the internal pressure load in the pressure range, destruction of the very brittle inner ring being avoided.

Figure 5:
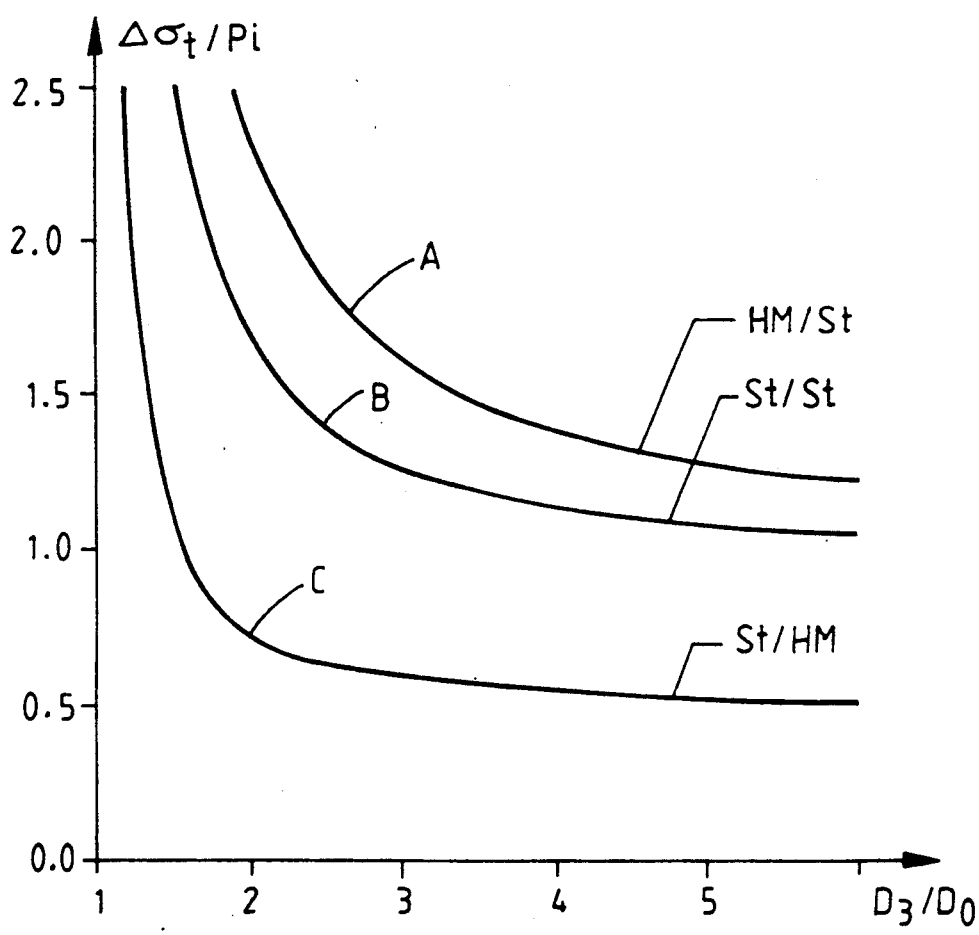
FIG. 5 is a graph showing the relationship of the tangential stress in the inner ring against the wall thickness ratio.

FIG. 5 shows the ratio of the tangential stress amplitude $\Sigma_t$ to the operating pressure $p_i$ against the ratio of the external diameter $D_3$ to the internal diameter $D_0$ for a two-part moulding tool according to FIG. 3. We are here concerned with the resultant tangential stresses at the inner periphery of the die. Curve A shows the conditions for a die of carbide metal HM and a ring of steel St, curve B shows the conditions for a steel die and steel ring and curve C shows the conditions for a steel die and a carbide metal ring. In all curves, it will be seen that relatively low tangential tensile stresses can be achieved with an increase in the diameter ratio. In practice, a ratio of $D_3/D_0$ of 4 to 6 is employed in cold flow tools.

Further, different tangential compression stresses are produced depending on the composition of the material. The largest stresses are obtained with a die of carbide metal and a prestressing ring of steel. Better conditions are obtained, if both parts are of steel. The best is when a steel die is combined with a carbide metal ring. This combination has not hitherto been proposed. Nor was it possible to produce same because the brittle carbide metal itself could not have withstood the comparatively low tangential stresses.

If, however, one uses a three-part moulding tool according to the invention and one combines a carbide metal inner ring with a steel outer ring lying against it under radial prestressing, the carbide metal ring can itself be so prestressed that only low tangential tensile stresses occur in operation. This enables one to utilise the favourable conditions according to curve C in FIG. 5 in practice. The fact that steel is generally less wear resistant than carbide metal is not a sacrifice because the life of this combination under otherwise the same conditions is a multiple of the life of a moulding tool having a carbide metal die.

FIG. 6 shows the ratio of the tangential; stress $\Sigma_p$ to the operating pressure $p_i$ against the ratio of the wall thickness $(D_2-D_1)$ of the inner ring 4 to the wall thickness $(D_2-D_0)$ of the moulding tool. The curve E shows the ratio in a moulding tool of which the three parts consist of steel St. The curve F shows the conditions for a moulding tool 1 according to the invention in which the inner ring 4 is of carbide metal but the die 2 and outer ring 5 of steel. The wall thickness $(D_1-D_0)$ of the die 2 is 10% of the wall thickness $(D_3-D_0)$ of the moulding tool. The ratio of the external diameter $D_3$ to the internal diameter $D_0$ is 5. Similar curves are obtained for other dimensions. It will therefore be evident that the construction according to the invention achieves a very considerable reduction in the tangential forces at the inner periphery of the die, which makes the use of higher operating pressures or complicated one-part dies permissible.

The manufacturing method is such that the inner ring is first prestressed by the outer ring in that a steel band is wound onto the inner ring under tension. Only then is the ring combination shrunk on to the die 2. The shrinking forces are harmless because the inner ring is prestressed. When the operating pressure occurs, the prestressing forces ensure that the tangential stress at the inner periphery is kept sufficiently small.

Shrinking on can be effected in any desired known manner, for example by heating the ring combination. However, it is also possible for the die and ring combination to be slightly conical at the contact surface and then pushed onto each other by employing axial pressing forces.

Instead of the illustrated coil of strip, the outer ring may also consist of two or more individual rings lying on each other under prestressing.

I claim:

1. A moulding tool comprising an annular die having a moulding cavity and an outer peripheral surface, an inner ring abutting against the die outer peripheral surface under a radial bias and having an outer peripheral surface and an outer ring abutting against the inner ring outer peripheral surface under a radial bias, said outer ring surrounds said inner ring and said inner ring surrounds said annular die, the inner ring being made of a material having a higher modulus of elasticity than the material of each of the die and the outer ring.

2. A moulding tool according to claim 1, characterized in that the inner ring material is at least 1.5 times the modulus of elasticity of the die material.

3. A moulding tool according to claim 1, characterized in that the die is made of steel and that the inner ring material is sintered carbide metal.

4. A moulding tool according to claim 1, characterized in that the outer ring consists of at least two layers.

5. A moulding tool according to claim 4, characterized in that the outer ring consists of a coiled strip.

6. A moulding tool according to claim 1, characterized in that the inner ring is of a wall thickness that is at least 25% of the combined wall thickness of the die and the inner and outer rings.

7. A moulding tool according to claim 6, characterized in that the inner ring is of a wall thickness that is at least 30% to 50% of the combined wall thickness of the die and the inner and outer rings.

8. A method of making a moulding tool comprising the steps of, forming an annular die with a moulding cavity and an outer peripheral surface, forming an inner ring from a material having a higher modulus of elasticity than said annular die and having an outer peripheral surface, forming an outer ring from a material having a lower modulus of elasticity than said inner ring, applying with radial prestressing the outer ring onto the outer peripheral surface of the inner ring so that the outer ring surrounds the inner ring and shrink fitting the thus formed inner and outer rings onto the outer peripheral surface of the annular die so that the outer and inner rings surround the annular die.

9. A method according to claim 8 characterized in that the outer ring is applied with radial prestressing by winding a steel band onto the inner ring and then the thus formed inner and outer rings are shrunk onto the die.

10. A method according to claim 8 characterized in that the outer ring is shrunk onto the inner ring.

11. A method according to claim 8 characterized in that the outer ring is made by winding a strip onto the inner ring.

* * * * *